United States Patent [19]

McCord

[11] Patent Number: 4,508,027
[45] Date of Patent: Apr. 2, 1985

[54] PORTION DIVIDING FRYING BASKET

[76] Inventor: Frederick B. McCord, 5121 Pinefield Dr., Macon, Ga. 31206

[21] Appl. No.: 563,081

[22] Filed: Dec. 19, 1983

[51] Int. Cl.³ .............................................. A47J 37/12
[52] U.S. Cl. ...................................... 99/416; D7/47;
  99/418; 99/448; 99/450; 220/22
[58] Field of Search .................. 99/450, 403, 410–418,
  99/448, 449, 426; 220/19, 22, 22.1, 22.2, 22.3;
  D7/47, 356, 409

[56] References Cited

U.S. PATENT DOCUMENTS

| 847,225 | 3/1907 | Barnard | 220/22 |
| 3,068,779 | 12/1962 | Eidlisz | 99/416 |
| 3,613,553 | 10/1971 | Popeil | 99/450 X |

Primary Examiner—Billy J. Wilhite
Attorney, Agent, or Firm—Newton, Hopkins & Ormsby

[57] ABSTRACT

A frying basket large enough to contain two or three individual servings of a food product is equipped with a pair of removable partitions including basket divider portions and right angular basket cover portions. When in place on the frying basket, two or three individual servings can be cooked simultaneously in the basket without intermixing, and when completely cooked, the individual servings can be dispensed one at a time from the basket while the remaining servings are retained in the basket for further cooking and subsequent dispensing. One or two of the removable partitions can be utilized with a standard size frying basket. The arrangement avoids the necessity for reweighing or recounting individual servings after cooking and avoids delivering unequal servings to customers.

15 Claims, 9 Drawing Figures

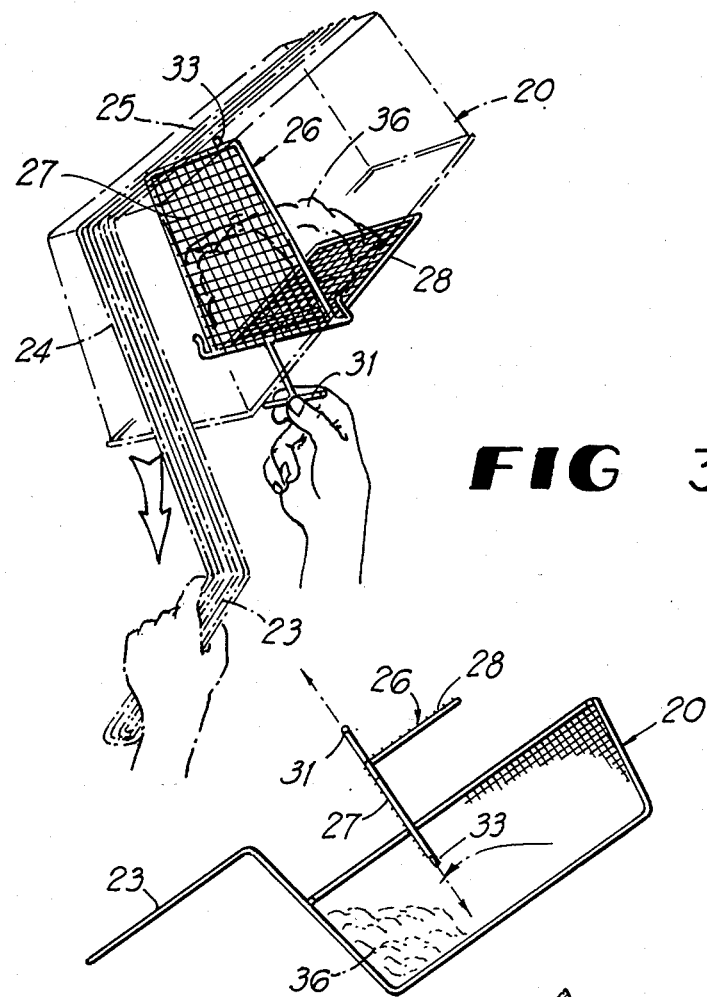
FIG 3
FIG 4
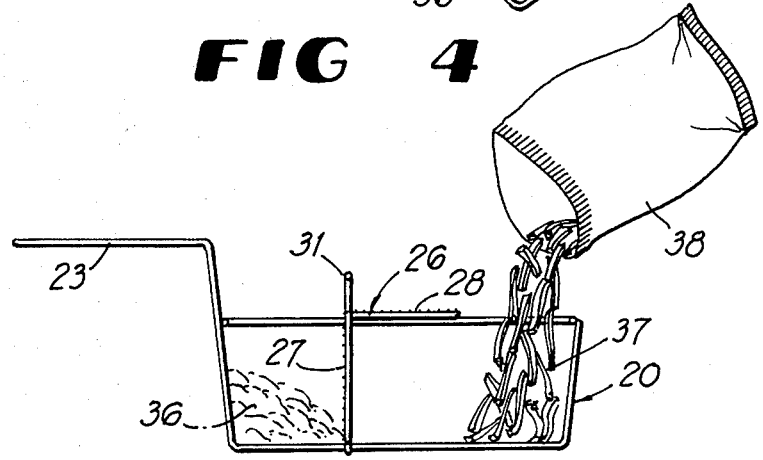
FIG 5

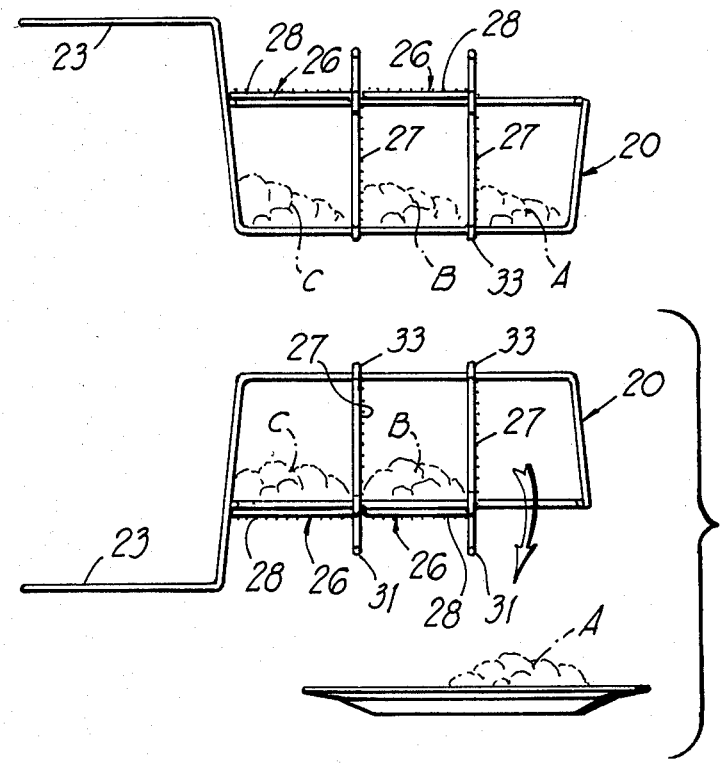
FIG 6
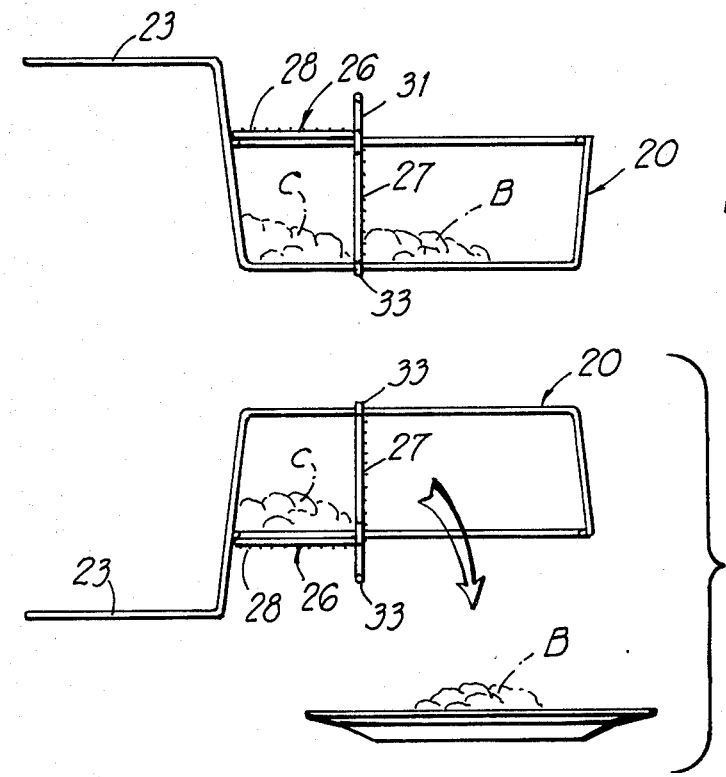
FIG 7
FIG 8
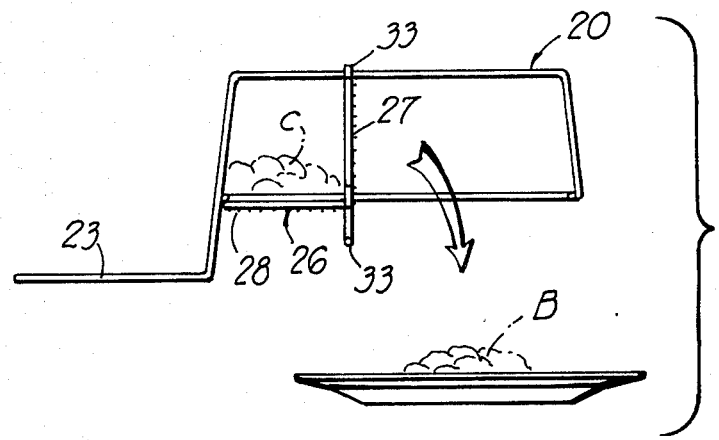
FIG 9

4,508,027

PORTION DIVIDING FRYING BASKET

BACKGROUND OF THE INVENTION

In restaurants, foods such as shrimp, chicken livers and the like are received in bulk packages. The bulk packages must be broken down by counting or weighing the product into individual servings of a specified size. The individual servings are re-packaged, ready for cooking, as needed. In many instances, a special worker is required to handle this preparation of individual servings from the bulk package.

Deep fat friers are widely employed to cook the above foods in hot shortening, a wire basket being employed to submerge the product in the shortening. Although the basket commonly used has a capacity for several individual servings, no means is provided to separate the servings or portions while cooking. Therefore, after cooking, the product must be reweighed or recounted before serving to assure the correct and uniform size of the serving to customers. Unfortunately, in many instances, particularly in rush periods, customers receive short portions, which in turn leads to customer complaints.

The objective of the present invention is simply to deal completely and successfully with the above problem in a restaurant while enabling the continued use of a standard size frying basket without the necessity of redesigning or changing the standard construction thereof. The invention, which is embodied in a removable partition and cover element for the basket, enables the simultaneous cooking in the basket of several individual servings and also enables the delivery onto a plate or the like of equal size individual servings, one at a time, after complete cooking, while retaining remaining servings in the basket in a separated state until complete cooking thereof is accomplished, after which the remaining equal size servings are dispensed from the basket one at a time.

The partition or divider unit does not preclude use of the basket for cooking a single large order of a food product when this is required. In this case, the partition unit is separated from the basket and set aside.

Other features and advantages of the invention will become apparent to those skilled in the art during the course of the following description.

BRIEF DESCRIPTION OF THE DRAWINGS

FIG. 3 is a perspective view of the invention showing the retention of one serving of a food product while dumping another serving.

FIG. 4 is a side elevational view showing the shifting of a retained individual serving to another position in the basket.

FIG. 5 is a further side elevational view showing the placement of an uncooked individual serving in a compartment of the basket.

FIGS. 6 through 9 are a schematic sequence of side elevational views illustrating the use of a basket equipped with the partition unit or units according to the invention.

DETAILED DESCRIPTION

Figure 1:
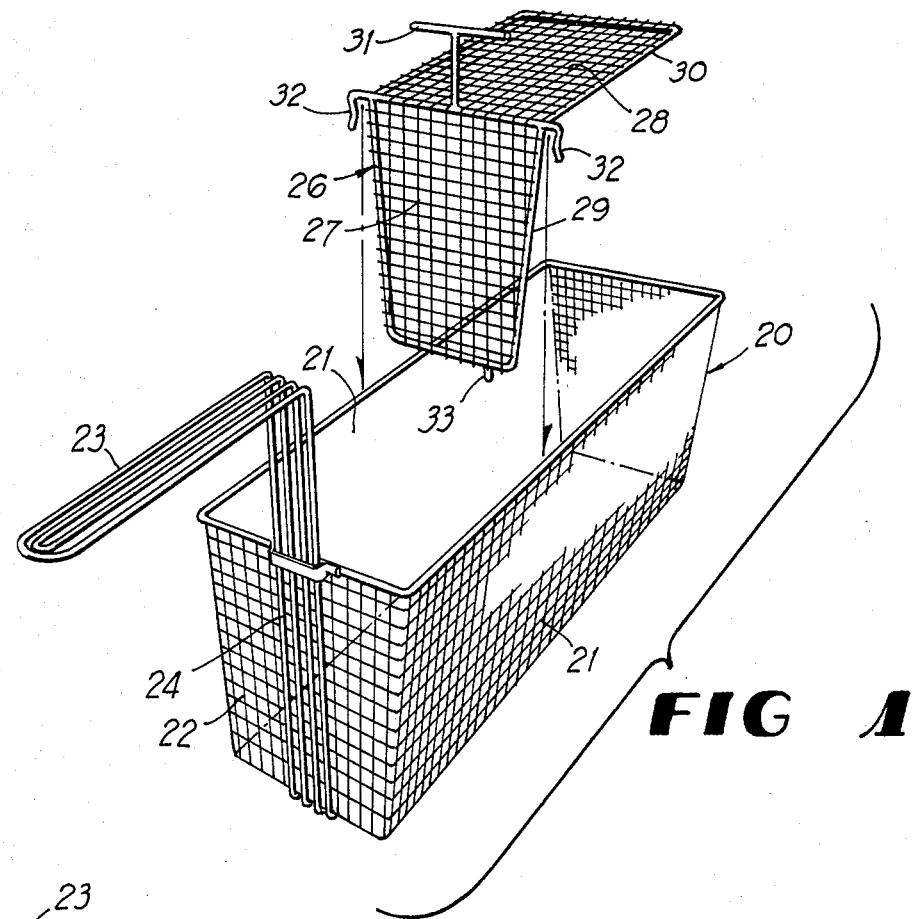
FIG. 1 is an exploded perspective view of a standard frying basket employed with a serving dividing and retaining partition unit according to the invention.

Referring to the drawings in detail wherein like numerals designate like parts, the numeral 20 designates a conventional food deep frying basket which is substantially rectangular and elongated, open at its top, and which has side and end walls 21 and 22 which are slightly convergent downwardly. At one end, the basket 20 is equipped with a sturdy lifting handle 23 formed of heavy wire which projects above the top of the basket and beyond one end thereof. The handle includes a generally vertical portion 24 which reinforces the adjacent wire mesh end wall 22 and an underlying horizontal portion 25 which extends along the basket bottom wall and reinforces it. The basket is conventional, as stated, and is sized according to restaurant industry requirements.

The invention proper is embodied in a partition unit 26 for use with the standard basket 20. The partition unit is L-shaped in side profile including wire mesh serving divider and cover panels 27 and 28 connected at right angles. The two mesh panels 27 and 28 have stiff wire frames 29 and 30 to rigidify them, and the panel 27 is slightly downwardly tapering to match the shape of the basket 20, while the panel 28 is rectangular, and sized to extend across the open top of the basket 20 between the two long side walls to cover a portion of the open top when the divider panel 27 is engaged with the bottom of the basket 20.

A lifting handle 31 for the partition unit 26 is provided thereon at the juncture of the two right angular panels 27 and 28 and at the transverse center of the unit. Two small dependent positioning arms 32 on the opposite sides of the unit 26 are adapted to engage over the tops of basket side walls 21 to stabilize the partition unit on the basket during use. A depending locator pin 33 on the bottom of divider panel 27 engages within one screen mesh aperture of the basket bottom wall to further locate and stabilize the partition unit 26 during the use of the invention.

As depicted in FIGS. 6 and 7 of the drawings, a pair of the partition units 26 according to the invention is preferably utilized on the standard size basket 20 to maximize efficiency. However, if preferred, only a single unit 26 may be used with the basket 20. A major feature of the invention is that the basket 20 can be used with or without the partition unit 26, and no design or structural change whatsoever is required in the basket 20 to accommodate the partition unit 26.

Figure 2:
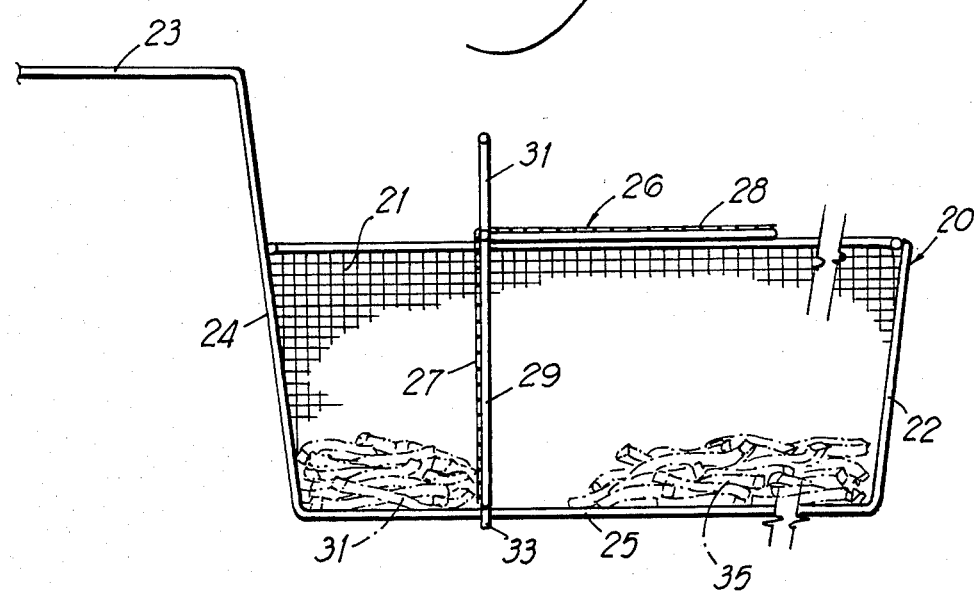
FIG. 2 is a fragmentary side elevation of the basket and partition unit, with the latter in one position of use.

FIG. 2 shows the partition unit 26 in one position of use on the basket 20 to divide or isolate one premeasured food serving 34 in one chamber of the basket from another individual food serving 35, forwardly of the divider panel 27.

FIG. 3 depicts the inverting of the basket 20 to dump therefrom one measured serving of cooked food while retaining in the basket by means of the unit 26 another measured serving 36.

FIG. 4 of the drawings shows how a retained food serving 36 can be shifted to a storage or dumping position in the basket 20 by lifting the partition unit 26 and tilting the basket 20. FIG. 5 shows a measured serving 37 of uncooked food being delivered into the basket 20 in separated relationship to the serving 36 from a single serving package 38.

While the uses of the partition unit or units 26 can be quite varied, FIGS. 6 through 9 illustrate a typical sequence of steps in utilizing the invention.

Referring to FIG. 6, as orders for fried food servings are received in a restaurant, a first premeasured serving A is placed in the basket 20 in its forward end portion and a first partition 26 is installed so that its divider panel 27 isolates the serving A from the remainder of the basket 20. The cover panel 28 spans and covers the middle portion of the top of the basket 20. A bit later, a second serving B of uncooked food is delivered from a package into the middle portion of the basket 20 on the other side of the divider panel 27. If a third food order is received, the basket 20 is tilted and shaken to move the second serving B forwardly toward the first serving A and the third serving C is introduced into the basket and a second partition unit 26 is installed with its divider panel 27 separating servings B and C. The two partition units 26 define three serving compartments within the basket 20. As previously stated, in many cases, it may be required to utilize only one partition unit 26 in the basket 20 and this depends upon the frequency at which food orders are received.

FIG. 7 shows the dumping or delivering of the first serving A from the frying basket 20 onto a plate while utilizing the two partition units 26 to retain the not fully cooked servings B and C within the basket.

FIG. 8 shows the basket 20 after one partition 26 has been removed to allow dumping of the serving B onto a plate or the like as depicted in FIG. 9.

It should be realized that FIGS. 6 through 9 show only one manner of using the invention, and that many variations of usage are possible. For example, comparing FIGS. 2 and 9, the cover panel 28 of the unit 26 can extend forwardly or rearwardly on the basket 20 in accordance with convenience and necessity. The user of the device, therefore, is not limited to a particular arrangement or sequence of servings in the basket 20, and the user may improvise with the invention to develop the most convenient procedures. In any case, the partition unit 26 serves a dual purpose of dividing servings of food within isolated compartments of the basket 20, while the cover panel 28 functions to retain one food serving in the basket while another serving is being dumped out, FIG. 3.

Another main benefit of the invention is that the use of the partition unit actually accelerates the cooking of multiple orders or servings in a multi-serving capacity basket. A second customer and/or third customer need not wait for the full cooking time required before the first-received order is fully cooked, and two or three servings or orders are being cooked simultaneously. This, in effect, doubles or triples the fry basket output, compared to traditional practice without the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A partition unit for use with a food frying basket of the type having foraminous upstanding sides and ends, a foraminous bottom and open at its top, so that the partition separates premeasured individual food servings being cooked in the basket for retaining one serving in the basket while an adjacent cooked serving is being dumped from the basket, said partition unit comprising an L-shaped unit consisting of substantially right angular, rigidly connected panels formed of foraminous material, one of said panels being of dimensions to be removably received in said basket for extending between said sides, spaced from and generally parallel to the ends of said basket, the other of said panels being of dimensions to extend across a portion of said open top of said basket for arresting food in a part of said basket when the basket is inverted, a lifting handle fixed on the partition unit to facilitate placing it in cooperative relationship with a frying basket and means for removably connecting a perimeteral portion of one of said panels to the said basket for arresting such partition unit when the basket is inverted.

2. A partition unit for use with a food frying basket to separate premeasured individual food servings being cooked in the basket and to retain one serving in the basket while an adjacent fully cooked serving is being dumped from the basket, said partition unit comprising an L-shaped unit consisting of substantially right angular, rigidly connected panels being joined at a junction and formed of foraminous material and a lifting handle on the partition unit to facilitate placing it in cooperative relationship with a frying basket, said handle being attached to the partition unit at the juncture of said panels and extending from the exterior of the unit at said juncture.

3. A partition unit for use with a food frying basket as defined in claim 2, and said handle lying in a common plane with one of said panels of the partition unit.

4. A partition unit for use with a food frying basket as defined in claim 3, and said one panel tapering somewhat toward its free end, and the other panel being substantially rectangular.

5. A partition unit for use with a food frying basket as defined in claim 4, and a locator and stabilizing pin for the partition unit on the free end of said one panel and adapted to enter a wire mesh opening in the bottom of a basket.

6. A partition unit for use with a food frying basket as defined in claim 5, and a pair of locator elements on the opposite sides of the partition unit adjacent to said juncture and being adapted to engage over the top edges of the side walls of a frying basket.

7. In a frying basket for plural premeasured individual food servings, an elongated open top foraminous frying basket having a handle, at least one substantially L-shaped foraminous partition unit including a divider panel engageable in the frying basket to divide the same into separated food serving compartments and a substantially right angular food serving retaining panel spaced from the bottom of the container and integrally, rigidly connected by a common edge to said divider panel overlying at least a portion of the open top of said basket, whereby when the basket is inverted to dump therefrom one food serving, a second food serving can be retained within the basket for further cooking and subsequent dumping; and means extending from spaced edge portions of said unit for retaining said partition unit on said basket when said basket is inverted.

8. In a frying basket as defined in claim 7, and a lifting handle and locator and stabilizing elements on said foraminous partition unit.

9. In a frying basket as defined in claim 7, and a pair of said foraminous partition units each including said divider panel and food serving retaining panel, whereby said basket is divided into three separated food serving compartments for simultaneous cooking of three food servings and sequential delivery thereof from said basket following complete cooking of each food serving while said partition units retain the incompletely cooked food servings in the basket for further cooking and subsequent delivery.

10. A device for separating premeasured individual food servings in a food frying basket and for retaining in the basket an incompletely cooked food serving while a completely cooked food serving is being dumped from the basket while the basket is inverted, said device comprising a formaminous, substantially right angular unit formed of foraminous material and having a first panel adapted to serve as a frying basket divider and a second panel integrally connected in a fixed position to said first panel along a common edge therewith, said second panel adapted to partially cover the open side of a frying basket and to serve as a food serving retainer when the basket is inverted.

11. A device as defined in claim 10, and a lifting handle on the device.

12. A device as defined in claim 10, and said foraminous material comprising wire mesh, and said panels including substantially rigid marginal frames to which said mesh is attached.

13. A food frying basket assembly having a frying basket of the type having a rectangular basket with opposed upstanding sides and opposed upstanding ends joning the ends of said sides, a bottom all formed of foraminous material, the bottom being joined to the sides and ends and a handle connected to one end of said basket by means of which the basket is lifted and inverted to discharge food carries in the basket, wherein the improvement comprises a partition unit for removable installation on said basket, said partition unit including a pair of diverging panels joined together along a common edge and being in a fixed angular position with respect to each other, one of said panels protruding through the open top into the basket, said one of said panels, when said partition unit is installed on said basket, extending from said common edge, downwardly into and across the interior of said basket between intermediate portions of said sides and forming a partition spaced from said ends for separating the food received in said basket; the other of said panels, when said partition unit is installed on said basket, being spaced from the bottom of said basket and extending from said common edge over one portion of the interior of said basket, said other of said panels protruding toward one of said ends; and means for removably retaining said partition unit on said basket when said basket is inverted so that said panels retaining the food in the portion of said basket over which said other of said panels extends.

14. The food frying basket assembly defined as claim 13 including a handle protruding from said common edge outwardly of said basket, when said partition unit is installed on said basket.

15. The food frying basket assembly defined in claim 13 wherein the last mentioned means includes members extending from spaced locations on said unit and engaging opposite sides of said basket for removably retaining said unit on said basket.

* * * * *